US008565171B2

(12) United States Patent
De Pasquale et al.

(10) Patent No.: US 8,565,171 B2
(45) Date of Patent: Oct. 22, 2013

(54) METHOD FOR DYNAMICALLY SETTING THE NUMBER OF HS-SCCH CHANNELS TO BE USED ON A CELL

(75) Inventors: Andrea De Pasquale, Madrid (ES); Francisco Javier Dominguez Romero, Madrid (ES)

(73) Assignee: Vodafone Group PLC, Newbury Berkshire (GB)

(*) Notice: Subject to any disclaimer, the term of this patent is extended or adjusted under 35 U.S.C. 154(b) by 370 days.

(21) Appl. No.: 12/714,240

(22) Filed: Feb. 26, 2010

(65) Prior Publication Data
US 2010/0214988 A1 Aug. 26, 2010

(30) Foreign Application Priority Data

Feb. 26, 2009 (ES) .................................. 200900539

(51) Int. Cl.
*H04W 4/00* (2009.01)
(52) U.S. Cl.
USPC ......................................................... 370/329
(58) Field of Classification Search
USPC .......................... 370/329, 328, 252, 352, 335
See application file for complete search history.

(56) References Cited

U.S. PATENT DOCUMENTS

| 2004/0085989 | A1 | 5/2004 | Boumendil | |
|---|---|---|---|---|
| 2005/0036461 | A1* | 2/2005 | Keil et al. | 370/329 |
| 2006/0077923 | A1 | 4/2006 | Niwano | |
| 2006/0153323 | A1 | 7/2006 | Kataoka et al. | |
| 2007/0253374 | A1 | 11/2007 | Gollamudi | |
| 2008/0175194 | A1* | 7/2008 | Blanz et al. | 370/329 |
| 2008/0285522 | A1* | 11/2008 | Ma et al. | 370/335 |
| 2009/0116432 | A1* | 5/2009 | Ma et al. | 370/329 |
| 2011/0286353 | A1* | 11/2011 | Blanz et al. | 370/252 |

FOREIGN PATENT DOCUMENTS

| EP | 1505846 | 2/2005 |
|---|---|---|
| EP | 1513297 | 3/2005 |
| WO | WO 2007035134 | 3/2007 |

OTHER PUBLICATIONS

Antipolis, Sohia, "Universal Mobile Telecommunications Systems (UMTS); High Speed Downlink Packet Access (HSDPA); Overall description; Stage 2 (3GPP TS 25.308 version 7.7.0 Release 7); ETSI TS 125 308", ESTI Standard, European Telecommunications Standards Institute (ETSI) Cedex, France, vol. 3-R2, No. V7. 7.0, Jul. 1, 2008, XP014042114, paragraph 5.
EP 10 15 4782 European Search Report dated Nov. 17, 2011.
200900539, mailed Feb. 26, 2009, Spanish Search Report.

* cited by examiner

*Primary Examiner* — Albert T Chou
(74) *Attorney, Agent, or Firm* — Workman Nydegger

(57) ABSTRACT

Embodiments of the invention relate to dynamically setting the number N of HS-SCCH channels to be used as signaling channels of the HS-DSCH traffic channel in a cell served by a Node B, which comprises, at predefined periods of time:
  determining the number N of HS-SCCH channels as a function of one or more of the following:
  percentage of used downlink transmission power, used_DL_TX_power, with respect to the maximum downlink transmission power in the cell, Cell_Max_DL_TX_power;
  number of users in the scheduler of the HS-DSCH channel for PS data traffic;
  number of codes being used for the HS-DSCH channel;
  number of users for voice over HSPA in the scheduler of the HS-DSCH channel; and
  sending a message from a Radio Network Controller, RNC, that controls the Node B including the number N of HS-SCCH channels to be used in said cell.

9 Claims, 1 Drawing Sheet

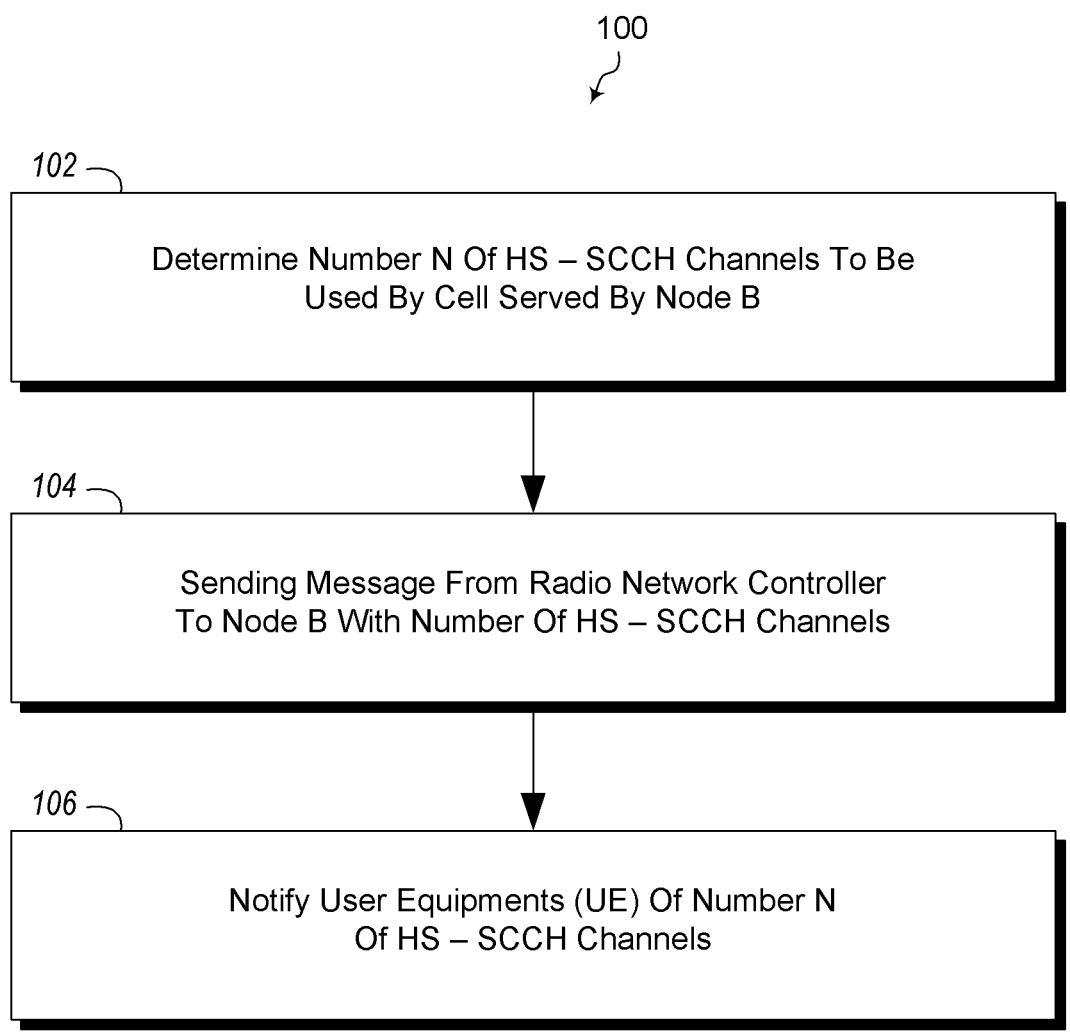

METHOD FOR DYNAMICALLY SETTING THE NUMBER OF HS-SCCH CHANNELS TO BE USED ON A CELL

CROSS-REFERENCE AND RELATED APPLICATIONS

This application claims the benefit of the Spanish Patent Application No. ES P200900539, filed on Feb. 26, 2009, which is hereby incorporated by reference in its entirety.

RELEVANT FIELD

Embodiments of the present invention pertain to the telecommunications field and, more specifically, in third generation (3G) networks supporting HSDPA.

BACKGROUND OF TECHNOLOGY

HSDPA is a high-speed packet data transmission system for the downlink in a wireless communication system. In HSDPA, a group of user equipments (UE) is scheduled in each Transmission Time Interval (TTI), which is 2 ms long. That is, within the 2 ms duration of a given TTI, a scheduler in the Node B selects a small number of UEs, to which data is to be transmitted in that 2 ms interval. In the next 2 ms interval, the scheduler may select another group of UEs to whom to transmit. Data is transmitted to each of the scheduled UEs via a physical channel called the HS-PDSCH (High-Speed Physical Downlink Shared Channel).

User equipments do not receive advance notice of particular TTIs in which they will be scheduled. Because a given scheduled user lacks such advance knowledge, the Node B must let the scheduled UE know that a particular transmission is meant for him. In HSDPA, this is achieved using a control channel called HS-SCCH (High-Speed Shared Control Channel). At any given time, each scheduled UE will be served by a distinct HS-SCCH channel. The various HS-SSCH channels are distinguished by having different spreading codes.

The HS-SCCH channel contains the unique identity of the user equipment (UE) who is scheduled, along with several parameters that the user will need in order to decode the received transmission. That is, it provides timing and coding information which allows the UE to listen to the HS-DSCH (High-Speed Downlink Shared Channel) at the correct time and using the correct codes. In other words, the HS-SSCH indicates which UE will receive information in a determined TTI.

So the HS-SCCH channel is a fixed rate (60 kbps, SF=128) downlink physical channel used to carry signalling related to HS-DSCH transmission. This High-Speed Shared Control Channel (HS-SCCH):

Carries the key necessary information for HS-DSCH demodulation.
The number of allocated HS-SCCH channels corresponds to the maximum number of users that will be code-multiplexed. Currently the maximum number of the HS-SCCH signals receivable by a user equipment is predetermined as four, so each UE will only need to consider a maximum of four HS-SCCH channels at a given time. The HS-SCCHs that are to be considered are signalled to the UEs under the coverage of a set of Node Bs by the RNC that controls those Node Bs.
Each HS-SCCH block has a three-slot duration that is divided into two functional parts. The HS-SCCH uses half-rate convolutional coding with the two parts of the block encoded separately. For protection, both HS-SCCH parts employ user equipment-specific scrambling to allow each UE to decide whether the detected control channel is actually intended for that particular UE.
The first slot (first part, Part1) carries the time-critical information that is needed to start the demodulation process in due time. Part1 parameters indicate: (i) the codes to de-spread; (ii) if QPSK or 16 QAM is used.
The next two slots (second part, Part2) contain less time-critical parameters. CRC is included to check the validity of the HS-SCCH information and HARQ (hybrid ARQ) process information.

Once a particular TTI of three slots (2 ms) has been assigned to a UE, the Node B identifies the necessary HS-DSCH parameters. For instance, how many codes are available, if 16 QAM can be used, and what are the UE capability limitations.

The Node B starts to transmit the HS-SCCH two slots before the corresponding HS-DSCH TTI to inform the UE of the necessary parameters.

The UE monitors the HS-SCCHs given by the network, and once the UE has decoded Part1 from an HS-SCCH intended for that UE, it will start to decode the rest of that HS-SCCH and will buffer the necessary codes from the HS-DSCH.

Upon having the HS-SCCH parameters decoded from Part 2, the UE can determine to which ARQ process the data belongs and whether it needs to be combined with data already in the soft buffer.

If the network continues to transmit data for the same UE in consecutive TTIs, the same HS-SCCH will be used.

As indicated before, there is a maximum of four HS-SCCH per cell, which allows having a maximum of four users receiving data in the same TTI. The drawback of having all four channels activated is that they use four SF128 codes, and also too much power since this channel has a very low power control in order to be able to reach all the UEs present in the cell.

Then, the optimised number of HS-SCCH channels depends mainly on the number of codes being used by HS-PDSCH, Release 99 traffic, and HSDPA traffic and its type.

Current implementations are based on a static setting of the number of HS-SCCH, which is not an optimal implementation since the optimal number of channels varies with the data traffic, that is different between different cells and at different times of the day.

If the setting is too high, i.e. too many HS-SCCH channels are enabled versus the current HSDPA traffic requirement, TX power could be wasted; and if it is too low the number of users supported simultaneously could not be enough to serve many low bit rate users in an efficient way.

PCT patent application published WO-A1-2008/050152, incorporated herein by reference, discloses a method of scheduling resources in a communication system which comprises allocating code space for users of a channel controlled by the base station, and allocating the same code space for users of a channel controlled by the network control entity. This document refers to the scheduler, but not to the HS-SCCH channels.

Then US patent publication number 2005171984 (A1), incorporated herein by reference, discloses a comprehensive dynamic management scheme of HS-DSCH channel codes.

SUMMARY OF EXAMPLE EMBODIMENTS

Embodiments of the invention include methods for dynamically setting the number of HS-SCCH channels to be used in a cell according, and to a network entity of a mobile communications network supporting HSDPA.

In one embodiment, a method is disclosed that dynamically sets the number of HS-SCCH channels to be used in a cell, informing the Node B and the user equipment UE of that N number of HS-SCCH channels.

In disclosed embodiments, the number of HS-SCCH channels is not statically predefined in a cell, but it is instead dynamically changed on a cell basis according to several criteria, all of them related to the traffic to be carried over a cell.

In a first example embodiment, a method for dynamically setting the number N of HS-SCCH channels to be used as signalling channels of the HS-DSCH traffic channel in a cell served by a Node B, comprises, at predefined periods of time:
  determining the number N of HS-SCCH channels as a function of one or more of the following:
    percentage of used downlink transmission power, used_DL_TX_power, with respect to the maximum downlink transmission power in the cell, Cell_Max_DL_TX_power;
    number of users in the scheduler of the HS-DSCH channel for PS data traffic;
    number of codes being used for the HS-DSCH channel;
    number of users for voice over HSPA in the scheduler of the HS-DSCH channel;
  sending a message from a Radio Network Controller, RNC, that controls the Node B including the number N of HS-SCCH channels to be used in said cell.

In some embodiments, the method further comprises:
  modifying the System Information message so that all user equipments, UE, in the cell are notified of the new number N of HS-SCCH channels; or
  sending a dedicated message to each user equipment UE in the cell with an RRC connection established.

Thus embodiments of the present invention provide methods for setting in a dynamic way the number N of HS-SCCH channels to be used as signalling channels of the HS-DSCH traffic channel in a cell served by a Node B. And it comprises dynamically calculating the number of simultaneous users per transmission time interval TTI of the HS-DSCH channel based on a diversity of parameters and variables from the HS-DSCH channels provided as input.

According to one embodiment the number N of HS-SCCH channels is determined as a function of average used downlink transmitted power, and the number of users in the scheduler of the HS-DSCH channel for PS data traffic.

According to this embodiment, the number N of HS-SCCH channels is initially set to 1, and then the number N of HS-SCCH channels needed is determined, at each transmission time interval TTI:
  if the average used downlink transmitted power, used_DL_TX_power, during said predefined period of time is below a pre-established percentage of the maximum downlink transmission power of the cell, Cell_Max_DL_TX_power, then
    if the number of user equipments in the scheduler queue is greater than N, then N is set as the maximum of N+1 and Nmax, Nmax being the maximum number of HS-SCCH channels per cell;
    if the number of user equipments in the scheduler queue is equal to N, then N is set to N;
    if the number of user equipments in the scheduler queue is less than N, then N is set to the minimum of N−1 and 1; and
  if the average used downlink transmitted power is above a pre-established percentage of the maximum downlink transmission power of the cell, Cell_Max_DL_TX_power, then N is set to the minimum of N−1 and 1.

Alternatively, the number N of HS-SCCH channels can be determined by means of a configurable table which provides the number N of HS-SCCH channels to be used depending on the number of codes allocated to the HS-DSCH channel.

According to another preferred embodiment the number N of HS-SCCH channels is determined by means of a configurable table which provides the number N of HS-SCCH channels to be used depending on the number of users for voice over HSPA (voice calls) in the scheduler of the HS-DSCH channel at said period of time.

The voice calls can be voice over IP or CS voice calls, for example.

Preferably the message is a physical shared channel reconfiguration request as defined in 3GPP 25.433.

The method can further comprise sending a message to each user equipment UE in the cell including the number N of HS-SCCH channels in the cell.

A second aspect of the present invention refers to a network entity of a mobile communications network supporting HSDPA, which comprises means for carrying out the methods described above.

In the context of the present invention, the term "network entity" is intended to mean any 3G Node B or eNode B which comprises at least one sector, having a user equipment connected thereto.

BRIEF DESCRIPTION OF THE DRAWINGS

In order that the manner in which the above-recited and other aspects of the invention are obtained, a more particular description will be rendered by reference to specific embodiments thereof which are illustrated in the appended drawings. Understanding that these drawings depict only exemplary embodiments of the invention and are not therefore to be considered limiting of its scope, exemplary embodiments of the invention will be described and explained with additional specificity and detail through the use of the accompanying drawings in which:

FIG. 1 is a flow chart illustrating aspects of method steps that that dynamically set the number of HS-SCCH channels to be used in a cell.

DETAILED DESCRIPTION OF EXAMPLE EMBODIMENTS

Reference will now be made in detail to example embodiments of methods that dynamically set the number of HS-SCCH channels to be used in a cell.

Referring to FIG. 1, which illustrates one example of method steps, denoted generally at 100, used to dynamically set the number N of HS-SCCH channels to be used as signalling channels of the HS-DSCH traffic channel in a cell served by a Node B. In the example embodiment, method 100 is performed at predefined periods of time.

Beginning at the step denoted at 102, the number N of HS-SCCH channels to be used by the cell served by Node B is determined.

The number of HS-SCCH channels to be used is determined, for example, as a function of one or more of the following factors, which are provided as input:
  the percentage of used downlink transmission power (used_DL_TX_power) with respect to the overall maximum transmission power in the cell (which is a static cell parameter linked to HW capabilities, Cell_Max_DL_TX_power)

the number of users in the HSDPA scheduler for PS data traffic;

the number of HSDPA codes being used;

the number of users for voice over HSPA in the scheduler.

There are a number of possible implementations of the function which will determine the number of HS-SCCH channels to be used in each case.

A first possibility is that the number N of HS-SCCH channels to be allocated in a cell is calculated based on traffic occupation, specifically, based on the occupation of the scheduler and on the usage of power by the HS-DSCH channel.

Initially one HS-SCCH channel is allocated.

Every TTI seconds the Node B scheduler knows the amount of DL TX power used in relation to the maximum available DL TX power in the cell, (Cell_Max_DL_TX_power).

In addition, the Node B scheduler knows the amount of UEs whose packets are queuing in the scheduler ready to be transmitted.

Based on the above, according to this embodiment: if the power used is below a pre-established threshold, that means it is possible to include more user equipments in the TTIs to use more power.

So in this case the number N of HS-SCCH channels needed for each TTI is determined as follows:

```
Every Y TTI,
  IF average used_DL_TX_power/Cell_Max_DL_TX_power < Z THEN
    IF number of UE in the scheduler queues > N THEN
      N = max(N+1, Nmax)
    ELSE IF number of UE in the scheduler queues = N THEN
      N = N
    ELSE
      N = min(1, N-1)
  ELSE IF average used_DL_TX_power/Cell_Max_DL_TX_power > Z-margin
      N = min(1, N-1)
``` where Nmax is the maximum number of HS-SCCH channels per cell as defined in the standards (currently set to 4), Y is the number of TTIs to average the used TX power in the cell in order to know if it is possible to include more UEs in the same TTI to increase the percentage used, Z is the percentage of used downlink TX power configurable to increase the number of channels, and 'margin' is just a percentage to be subtracted to Z in order to have an hysteresis to avoid ping-pong effect of many HS-SCCH number of channels changes.

A second possibility is that the number N of HS-SCCH channels needed is calculated based on the number of HSDPA codes used at a specific time, i.e., the number of codes allocated to the HS-DSCH channel. If there is no R99 traffic, the codes are allocated to HSDPA, but instead, if R99 traffic is too high, it steals codes to the HSDPA up to a minimum configurable value.

So in this case, the number N of HS-SCCH channels is a function of the number of codes available to HSDPA traffic; this function can be implemented, for instance, using a configurable table which sets the number of HS-SCCH channels (up to Nmax, currently Nmax=4) depending on the HSDPA codes used:

| HSDPA codes used | HS-SCCH |
|---|---|
| 1 | 1 |
| 2 | 1 |
| 3 | 2 |
| 4 | 2 |
| ... | ... |
| 8 | 3 |
| 9 | 3 |
| ... | ... |
| 16 | Nmax |

A third possibility is that the number N of HS-SCCH channels is calculated based on the type of calls. Considering that in the future there will be voice calls carried over HSDPA (Voice over IP or CS over HSPA), the consumption of these calls per user will be very low, so a lot HS-SCCH channels will be needed in order to multiplex many users.

Therefore, according to this third embodiment, the number N of HS-SCCH channels needed for each TTI is determined based on the number of voice calls over HSPA in a moment as follows (considerina Nmax=4):

| | |
|---|---|
| from 0 calls to X1 | then N = 1 |
| from X1 + 1 to X2 | then N = 2 |
| from X2 + 1 to X3 | then N = 3 |
| from X3 + 1 onwards | then N = 4 | where X1, X2 and X3 are configurable numbers of voice calls being carried over HSDPA.

Still a fourth possibility is that the number N of HS-SCCH channels is calculated as a combination of two or more of the above cases.

For example, according to a fourth embodiment, the number N of HS-SCCH channels is determined as follows:

```
Every Y TTI,
  IF average used_DL_TX_power/Cell_Max_DL_TX_power < Z THEN
    IF number of UE in the scheduler queues > N THEN
      N = max(N+1, Nmax, MaxBasedOnCodes)
    ELSE IF number of UE in the scheduler queues = N THEN
      N = N
    ELSE
      N = min(1, N-1, MinBasedOnVoice)
  ELSE IF average used_DL_TX_power/Cell_Max_DL_TX_power > Z-margin
      N = min(1, N-1)
``` where Nmax, Y, Z and 'margin' are as defined in the first embodiment, and parameter 'MaxBasedOnCodes' is obtained from the following configurable table which takes into account the codes assigned to HS-DSCH:

| Codes for HS-DSCH | MaxBasedOnCodes |
|---|---|
| 1 | 1 |
| 2 | 1 |
| 3 | 2 |
| ... | ... |
| 15 | Nmax | and the parameter 'MinBasedOnVoice' gives the minimum number of HS-SCCH depending on the number of voice calls over HSPA:

| Number of voice calls over HSPA | MinBasedOnVoice |
| --- | --- |
| 1 | 1 |
| 2 | 1 |
| 3 | 1 |
| ... | ... |
| 8 | 2 |
| 9 | 2 |
| ... | ... |
| 16 | 3 |

Once the number N of HS-SCCH channels is determined, at step 104, Node B is informed of that number. For example, the RNC can inform the Node B with the use of 3GPP standard messages, specifically using the Physical Shared Channel Reconfiguration Request as defined in 3GPP 25.433.

At step 106, UE's are informed of the number N of HS-SCCH channels. For example, the set of messages called "System Information 5" carrying the HSDPA configuration that is broadcasted in the cell is also changed, so that all UEs are notified of the changes in the number N of HS-SCCH channels. The information element included in System Information 5 is the "HS-DSCH common system information" that contains the HS-SCCH system information. If the UE is in Cell_DCH state, it cannot read the system information, so it is necessary to send a Transport Channel Reconfiguration with the new information of HS-SCCH channels inserted in the "Downlink HS-PDSCH Information". All these messages are defined in 3GPP 25.331.

With the method of the present invention, it is possible to dynamically estimate the number of resources strictly needed on a UMTS cells, increasing the cell efficiency/capacity.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method for dynamically setting a number N of High-Speed Shared Control Channel (HS-SCCH) channels to be used as signalling signaling channels of a High-Speed Downlink Shared Channel (HS-DSCH) traffic channel in a cell served by a Node B, which comprises, at predefined periods of time:
   determining the number N of HS-SCCH channels as a function of one or more of the following:
      percentage of used downlink transmission power, used_DL_TX_power, with respect to the maximum downlink transmission power in the cell, Cell_Max_DL_TX_power;
      number of users in the scheduler of the HS-DSCH channel for data traffic;
      number of codes being used for the HS-DSCH channel;
      number of users for voice over High Speed Packet Access (HSPA) in the scheduler of the HS-DSCH channel; and
   sending a message from a Radio Network Controller (RNC) that controls the Node B including the number N of HS-SCCH channels to be used in said cell,
   wherein when the number N of HS-SCCH channels is determined as a function of average used downlink transmitted power and the number of users in the scheduler of the HS-DSCH channel for data traffic, the number N of HS-SCCH channels needed is determined, at each transmission time interval (TTI) according to the following:
      the number N of HS-SCCH channels is initially set to 1;
      if the average used downlink transmitted power, used_DL_TX_power, during said predefined period of time is below a pre-established percentage of the maximum downlink transmission power of the cell, Cell_Max_DL_TX_power, then
         if the number of user equipments in the scheduler queue is greater than N, then N is set as the maximum of N+1 and Nmax, Nmax being the maximum number of HS-SCCH channels per cell;
         if the number of user equipments in the scheduler queue is equal to N, then N is set to N;
         if the number of user equipments in the scheduler queue is less than N, then N is set to the minimum of N−1 and 1; and
      if the average used downlink transmitted power is above a pre-established percentage of the maximum downlink transmission power of the cell, Cell_Max_DL_TX_power, then N is set to the minimum of N−1 and 1.

2. The method according to claim 1, which further comprises:
   modifying a piece of information defined in the 3GPP 25.433 standard as "System Information message 5" so that all user equipments (UE) in the cell are notified of the new number N of HS-SCCH channels; and
   broadcasting in the cell the modified "System Information message 5".

3. The method according to claim 1, wherein the number N of HS-SCCH channels is determined by a dynamically configurable table which provides the number N of HS-SCCH channels to be used depending on the number of codes allocated to the HS-DSCH channel.

4. The method according to claim 1, wherein the number N of HS-SCCH channels is determined by a dynamically configurable table which provides the number N of HS-SCCH channels to be used depending on the number of users for voice over HSPA in the scheduler of the HS-DSCH channel at said period of time.

5. The method according to claim 4, wherein voice over HSPA is voice over IP or CS voice calls.

6. The method according to claim 1, wherein said message is a physical shared channel reconfiguration request as defined in 3GPP 25.433.

7. The method according to claim 1, which further comprises sending a message to each user equipment UE in the cell including the number N of HS-SCCH channels in the cell.

8. A Node B, eNode B or RNC of a mobile communications network supporting High Speed Downlink Packet Access (HSDP) which comprises means for carrying out the method of claim 1.

9. A method for dynamically setting a number N of High-Speed Shared Control Channel (HS-SCCH) channels to be used as signaling channels of a High-Speed Downlink Shared Channel (HS-DSCH) traffic channel in a cell served by a Node B, which comprises, at predefined periods of time:
   determining the number N of HS-SCCH channels needed for as a function of a number of users for voice over High Speed Packet Access (HSPA) in the scheduler of the HS-DSCH channel, wherein the number N of HS-SCCH channels needed is determined, at each transmission time interval (TTI) according to the following:
      from 0 calls to X1, then N=1;
      from X1+1 to X2, then N=2;

from X2+1 to X3, then N=3;
from X3+1 onwards, then N=4,
wherein X1 is a first configurable number of calls, X2 is a second configurable number of calls, and X3 is a third configurable number of calls; and
sending a message from a Radio Network Controller (RNC) that controls the Node B including the number N of HS-SCCH channels to be used in said cell.

* * * * *